Patented June 26, 1945

2,379,075

UNITED STATES PATENT OFFICE 2,379,075

ENAMEL COMPOSITION

John W. Garrison, Cleveland, Ohio, assignor to General Electric Company, a corporation of New York No Drawing. Application May 20, 1941,
Serial No. 394,361

2 Claims. (Cl. 106—48)

My invention relates in general to enamel compositions and more particularly to non-lead enamel compositions. The enamel comprising my invention is especially adapted for application as a coating to glass electric lamp bulbs and it may be applied to the exterior surfaces of ordinary lamp bulbs or to the interior or exterior surfaces of glass tubes.

It is an object of the present invention to provide an enamel having a desirable, comparatively low, coefficient of expansion. A further object is to provide an enamel having a comparatively low softening point of not more than about 1200° F.

A still further object is to provide an enamel having high stability, i. e., resistance to chemical attack by weather and cleaning agents.

A still further object is to produce an enamel which is opalescent but not transparent without the aid of mill additions of opacifying materials.

Further objects and advantages will appear from the following description.

It is well known that certain enamel making materials tend, when incorporated in the enamel, to produce one or more desirable results but in so doing many of them also work against other desirable results. It cannot be predicted in advance how a variation of the relative proportions of the different ingredients will affect certain of the features referred to in the objects of this invenion. The present invention therefore contemplates the selection of certain known non-lead enamel making materials in such relative proportions as will produce an enamel having the desired properties referred to above.

One of the features of the enamel compositions comprising my invention is that there is present an amount of zinc oxide which is preferably at least as great as that of any other single major constituent. Another feature is the production of a low melting zinc borosilicate composition containing an opacifying content of zinc oxide. Another feature is a high percentage of zinc oxide, preferably greater than about 28 per cent, which tends to produce high stability. Another feature is that the zinc borosilicate enamel has a low coefficient of expansion of about $$78 \times 10^{-7}$$

at 92° C., 82 at 185° C. and 87.5 at 300° C.

The objects of my invention are attained in an enamel composition made from the batch mix and having a composition as follows:

|  | Raw batch mix | Frit |  | Percent |
|---|---|---|---|---|
| $SiO_2$ | 200.0 | $SiO_2$ | 200.0 | 25.3 |
| $Al(OH)_3$ | 10.0 | $Al_2O_3$ | .7 | .9 |
| CdO | 35.0 | CdO | 35.0 | 4.4 |
| ZnO | 230.0 | ZnO | 230.0 | 29.2 |
| $Ba(NO_3)_2$ | 80.0 | BaO | 47.0 | 6.0 |
| $H_3BO_3$ | 330.0 | $B_2O_3$ | 186.0 | 23.6 |
| $As_2O_3$ | 15.0 | $As_2O_3$ | 5.0 | .6 |
| $K_2CO_3$ | 57.5 | $K_2O$ | 39.2 | 5.0 |
| $Na_2CO_3$ | 67.5 | $Na_2O$ | 39.6 | 5.0 |
|  |  |  |  | 100.0 |

It is important that the barium oxide be introduced as barium nitrate. I also prefer to use crystalline boric acid rather than the granular form because it melts more easily.

In preparing the enamel, the raw materials are first mixed together and placed in containers free from all contamination. The mixture is then placed in a smelting furnace, either of the continuous or pot type, at a temperature of approximately 900° C. The melted batch is then discharged into water to break it up, and is then placed in metal trays to dry.

The following are examples of three additional enamel compositions which fall within the scope of this invention:

|  | A | | B | | C | |
|---|---|---|---|---|---|---|
|  | Frit | Per cent | Frit | Per cent | Frit | Per cent |
| $SiO_2$ | 200.0 | 25.6 | 225.0 | 26.6 | 220.0 | 27.9 |
| $Al_2O_3$ | 26.4 | 3.4 | 20.0 | 2.4 | 10.0 | 1.3 |
| CdO | 35.0 | 4.5 | 35.0 | 4.1 | 35.0 | 4.5 |
| ZnO | 220.0 | 28.2 | 230.0 | 27.2 | 220.0 | 27.9 |
| BaO | 46.9 | 6.0 | 47.0 | 5.6 | 47.0 | 6.0 |
| $B_2O_3$ | 175.0 | 22.5 | 175.0 | 20.7 | 178.0 | 22.6 |
| $As_2O_3$ | 5.0 | .6 | 5.0 | 0.6 | 5.0 | 0.6 |
| $K_2O$ | 35.5 | 4.5 | 53.0 | 6.3 | 35.3 | 4.5 |
| $Na_2O$ | 36.9 | 4.7 | 55.0 | 6.5 | 36.7 | 4.7 |
|  | 780.7 | 100.0 | 845.0 | 100.0 | 787.0 | 100.0 |

It will be noted that in the above compositions the boric oxide and silica are present in an amount equal to approximately 50 per cent by weight of the total composition and the zinc oxide is present in an amount at least equal to that of any other single constituent. Moreover, the boric oxide, silica and zinc oxide constitute approximately 75 per cent of the total composition.

The enamel further contains the oxides of aluminum, cadmium and barium in a total amount of about 10 to 15 per cent, while alkali oxides are present in an amount of about 8–15 per cent.

What I claim as new and desire to secure by Letters Patent of the United States is:

1. A zinc borosilicate enamel composition comprising boric oxide and silica in an amount equal to approximately 50 per cent by weight of the total composition, and zinc oxide in an amount at least about equal by weight to that of any other single constituent, the said boric oxide, silica and zinc oxide constituting approximately 75 per cent by weight of the total composition, the composition further containing the oxides of aluminum, cadmium and barium in a total amount of approximately 10 to 15 per cent, and approximately 8 to 15 per cent of alkali oxides.

2. A zinc borosilicate enamel having approximately the following composition by weight:

| | Per cent |
|---|---|
| $SiO_2$ | 25–28 |
| $Al_2O_3$ | 1–4 |
| $CdO$ | 4–5 |
| $ZnO$ | 26–30 |
| $BaO$ | 5–7 |
| $B_2O_3$ | 20–24 |
| $As_2O_3$ | 0.6 |
| $K_2O$ | 4–7 |
| $Na_2O$ | 4–7 |

JOHN W. GARRISON.